[11] 3,558,891

| [72] | Inventor | Peter Kaiser<br>Matawan Township, Monmouth, N.J. |
|---|---|---|
| [21] | Appl. No. | 697,442 |
| [22] | Filed | Jan. 12, 1968 |
| [45] | Patented | Jan. 26, 1971 |
| [73] | Assignee | Bell Telephone Laboratories, Incorporated<br>Murray Hill, Berkeley Heights, N.J.<br>a corporation of New York |

[54] VISCOUS-FRICTION-HEATED OPTICAL GUIDING APPARATUS
14 Claims, 3 Drawing Figs.

[52] U.S. Cl. .................................................. 250/199, 350/179
[51] Int. Cl. .................................................. H04b 9/00
[50] Field of Search ....................................... 250/199; 350/96, 179, 63

[56] References Cited
UNITED STATES PATENTS

| 3,224,330 | 12/1965 | Kompfner | 250/199X |
| 3,385,970 | 5/1968 | Coffin, Jr. et al. | 250/199 |
| 3,400,993 | 9/1968 | Beck et al. | 350/179 |
| 3,410,627 | 11/1968 | Berreman et al. | 350/179 |
| 3,410,628 | 11/1968 | Conklin | 350/179 |
| 3,413,059 | 11/1968 | Berreman | 350/179 |
| 3,415,588 | 12/1968 | Berreman | 350/179 |
| 3,457,001 | 7/1969 | Miller | 350/179 |
| 3,467,098 | 9/1969 | Ayres | 350/96UX |

*Primary Examiner*—Robert L. Griffin
*Assistant Examiner*—R. S. Bell
*Attorneys*—R. J. Guenther and Arthur J. Torsiglieri ABSTRACT: In an optical guiding apparatus employing a gas, substantially continuous focusing action is provided by producing a velocity of the gas that generates heating by viscous shear work. The resulting transverse variation of temperature and of refractive index enables the gas to provide converging focusing action. The inlet velocity of the gas preferably lies in a range between about 0.04 and 0.08 times the speed of sound; and the plurality of gas introducing means and gas exhausting means are operated at absolute pressures substantially above atmospheric pressure in order to provide focusing in a substantial length of conduit while maintaining the gas exhaust velocity below the speed of sound. Porous sections of conduit are illustratively used for introducing and exhausting the gas in a radially symmetrical fashion.

VISCOUS-FRICTION-HEATED OPTICAL GUIDING APPARATUS

BACKGROUND OF THE INVENTION

This invention relates to apparatus for guiding a beam of optical electromagnetic radiation or any other electromagnetic radiation having a wavelength smaller than the internal dimensions of a conduit in which guiding is to be accomplished.

Optical transmission within a conduit may be valuable in proposed optical communication systems for such reasons as the protection of the optical beam from fog, rain and other atmospheric disturbances. When the wavelength of a beam is less than the internal dimensions of the conduit, the beam will diverge according to the well-known laws of diffraction. Nevertheless, the conduit provides a suitable environment in which any needed focusing of the optical beam may be accomplished.

Among the various arrangements that have been proposed for focusing an optical beam within a protective conduit are arrangements of solid lenses, of gas lenses, and even liquid lenses. Each of these alternatives may have advantages in particular types of systems or external environments.

One of the problems associated with gas lens systems is that they have evolved an increasing degree of structural complexity in order to solve the various problems associated with them, such as gravity effects.

Thus, I have sought a new approach to gas lens systems in order to obtain simpler systems.

SUMMARY OF THE INVENTION

I have discovered that the temperature rise due to the viscous shear work in a high speed gas flow in a conduit is sufficient to create a significant transverse refractive index variation suitable for substantially continuous focusing of a beam of electromagnetic radiation transmitted through the conduit. High speed, in this context, means an inlet velocity of the gas in a range from a velocity approximately twice that suggested for any prior art gas lenses up to a velocity slightly less than the speed of sound. Inasmuch as it is well known that the velocity of a gas flow in a conduit increases downstream from its inlet point because of pressure drop, it follows that the exhaust velocity of a gas in my system is somewhat greater than the inlet velocity.

According to another aspect of my invention, I have discovered that by operating both the gas introducing means and the gas exhausting means at pressures substantially higher than atmospheric pressure, substantially uniform focusing action can be obtained along the conduit.

According to one feature of my invention, the gases are introduced and exhausted in a radially symmetrical fashion through porous sections of the conduit. The remaining sections of the conduit are provided with interior surfaces that are much smoother than the interior surfaces of the porous sections. The smooth surfaces tend to minimize the wall-friction-induced pressure drop along the conduit and thus provide that the gas introducing means and gas exhausting means can be spaced relatively far apart.

According to other aspects of my invention, the broadest useful range of inlet gas velocity is from 0.02—1.0 times the speed of sound. A useful intermediate range of inlet gas velocity is 0.04—0.2 times the speed of sound, and the preferred range of inlet gas velocity is from 0.04—0.08 times the speed of sound. It may be noted that the highest gas velocities previously proposed for gas lenses involve gas velocities not significantly greater than 0.01 times the speed of sound, as disclosed in the article by D. Marcuse in the I.E.E.E. Transactions, MTT—13, page 734, Nov. 1965. Such prior art gas lenses relied upon the transfer of heat energy from an external source for focusing action.

It is, therefore, a characteristic of my invention that external application of or removal of heat is unnecessary to the operation of my guiding apparatus, although externally applied heat may be employed to supplement the viscous heating effect of my invention in order to provide a more nearly parabolic transverse variation of the refractive index. Moreover, my guiding apparatus does not depend upon any convection within the gas or upon the presence or absence of turbulence. In fact, I have operated embodiments of my invention with highly turbulent flow and have found negligible deleterious effects upon the focusing action when the guide was operated in the above-mentioned preferred range of inlet velocities. Moreover, the turbulence serves to overcome gravity-induced aberrations of the focusing because of the superior mixing provided by turbulence. Nevertheless, significant focusing action would also be obtained from viscous heating, according to my invention, with a laminar gas flow at the velocities described above.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENTS

Figure 1:
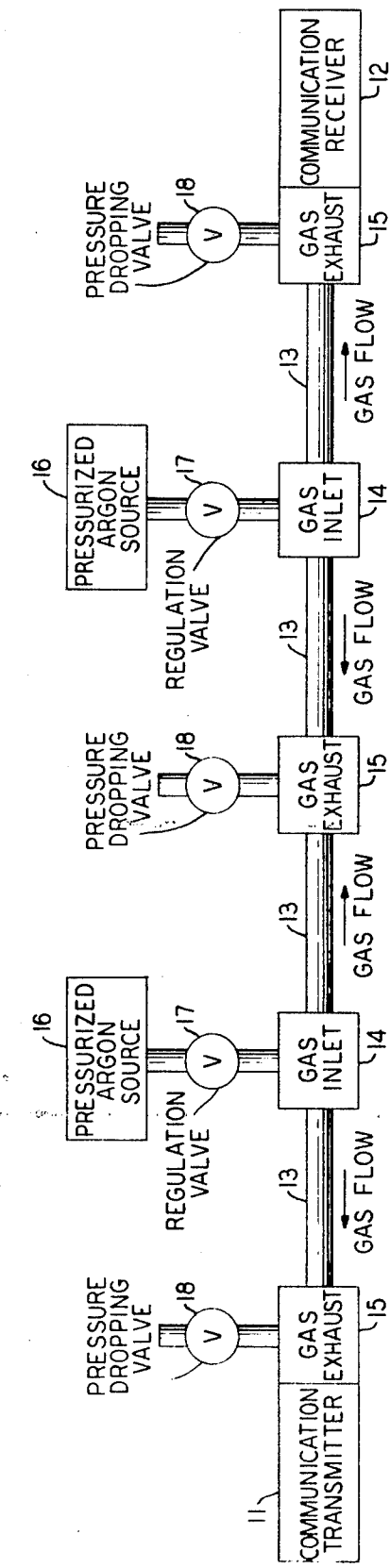
FIG. 1 is a partially pictorial and partially block diagrammatic illustration of an illustrative embodiment of my invention.

In the embodiment of FIG. 1, an information modulated light beam is to be transmitted from a communication transmitter 11 to a communication receiver 12, both of any type known in the optical communication art. The modulated optical beam from the transmitter 11 is introduced into the guiding apparatus, which extends between transmitter 11 and receiver 12, through an appropriate window (not shown). Similarly, the beam passes from the guiding apparatus into receiver 12 through an appropriate window (not shown).

The optical guiding apparatus comprises a conduit 13, illustratively a stainless steel conduit three-sixteenths inch in internal diameter, a plurality of gas introducing means 14 spaced apart along the conduit 13 and a plurality of gas exhausting means 15 spaced apart along the conduit and staggered with respect to the gas introducing means 14. Suitable pressurized gas sources 16, illustratively bottled argon, are coupled to the inlet ports of the gas introducing means 14 through appropriate pressure regulation valves 17. The exhausted gas passes from the exhaust ports of the gas exhausting means 15 through pressure dropping valves 18 to the atmosphere, or any other recipient at a pressure below the inlet pressure. Since the inlet pressure is always higher than the exhaust pressure, it may be seen that all the gas pressures in the system of FIG. 1 are substantially above atmospheric pressure. I prefer an inlet gas pressure on the output side of regulation valves 17 which is 400—600 pounds per square inch and a gas pressure on the high-pressure side of valves 18 which is between 300—590 pounds per square inch. Nevertheless, I have operated an embodiment of my invention with inlet pressures between 30—90 pounds per square inch and exhaust pressures between 14.7—60 pounds per square inch.

The internal surfaces of conduit 13 in the sections between the gas introducing means 14 and the gas exhausting means 15 are made as smooth as possible in order to minimize wall friction.

Figure 2:
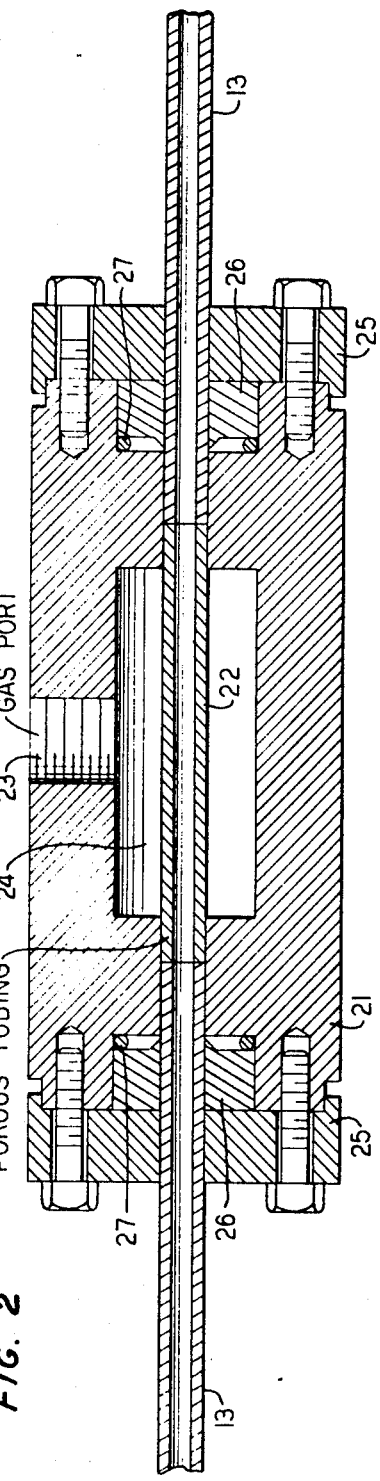
FIG. 2 is a cross-sectional view of details of the substantially identical gas introducing means and gas exhausting means of FIG. 1.

Further details of the gas introducing means 14 and the gas exhausting means 15, which may be substantially identical, may be understood with reference to the cross-sectional view of FIG. 2. The introducing or exhausting apparatus includes a metal housing 21 which surrounds a porous stainless steel section 22 of the conduit 13. Such porous stainless steel tubing is made by various companies for use as air filters, for example. The housing 21 also serves to seal the ends of the porous section 22 to the mating ends of the nonporous sections of conduit 13 which extend beyond the housing 21. The housing 21 has an air inlet port 23 illustratively centrally disposed in a side wall of the housing over a central chamber 24 that surrounds the porous conduit section 22. As shown in FIG. 1, suitable tubing and valves may be coupled to the inlet port. In the versions of the apparatus of FIG. 2 used as gas exhausting means, the inlet port 23 becomes the exhaust port without other change in the structural arrangement.

The apparatus of FIG. 2 also includes end caps 25 which are screw mounted to the housing 21 and friction fit upon the nonporous sections of conduit 13 so that an axial force can be produced tightening the screws to push the nonporous sections 13 axially into contact with the section 22. The apparatus may, optionally, also include washers 26 and 27 suitable for reducing strains in the apparatus.

In the operation of the embodiment of FIG. 1, including gas introducing and exhausting means as shown in FIG. 2, my experiments show that a transverse refractive index variation of approximately parabolic form, e.g., having a quadratic variation with radius, is actually produced when the inlet and exhaust pressures are mutually adjusted so that the inlet gas velocity is greater than about 0.02 times the local speed of sound.

The transverse refractive index variation is caused by a transverse temperature variation. The temperature variation, in turn, is produced by viscous shear work within the high speed gas flow as a result of a transverse velocity variation. It should be noted that it is viscous shear work within the gas itself and not wall friction which produces the desired effect.

In fact, it is desirable to keep wall friction as low as possible, since it tends to reduce the usable length of the conduit 13 between each gas introducing means and the neighboring gas exhausting means. In other words, wall friction produces an axial pressure drop as the gas flows along the pipe; and the gas velocity correspondingly rises downstream. If the gas velocity were allowed to reach the speed of sound, the flow would be "choked" and the ensuing reduction of the flow rate would reduce the focusing action.

My experiments have also shown that, when the absolute inlet and exhaust pressures are raised, the difference between inlet velocity and exhaust velocity can be reduced for a given length of the nonporous conduit sections 13 and for a given focusing action. Conversely, for a specified exit speed, the length of those sections can be increased as compared to their length in a system using lower inlet and exhaust gas pressures.

Assuming a transverse parabolic velocity profile and a negligible change of the Mach number M in the axial direction, one can derive an expression for the radius $\omega$ of a Gaussian light beam with wavelength $\lambda$ which does not change its size substantially in a guide of radius $a$:

$$\omega = \frac{1}{\pi}\sqrt{L \cdot \lambda} \quad (1)$$

$$L \cong \frac{3.3a}{M\sqrt{(n_0-1)(k-1)p/p_0}} \quad (2)$$

Here, $n_0$ represents the refractive index at atmospheric pressure $p_0$, $k$ is the ratio of the specific heat at constant pressure to the specific heat at constant volume, and $p$ is the average pressure of the gas. L is equivalent to half the period of oscillation about the axis of a light beam injected off axis into the guide.

For a given internal radius of the conduit 13, increased focusing power of the guiding apparatus is obtained by selecting a gas of greater index of refraction, by the use of a monatomic gas, and by an increase in the inlet and exhaust pressures. It is the relative high ratio of specific heat at constant pressure to specific heat at constant volume for a monatomic gas, as cm compared to a polyatomic gas, that enables superior focusing action.

The strength of the converging lens effect increases downstream as the gas velocity rises. Some beam size variation will occur throughout each nonporous conduit section 13, in which focusing is occurring, although it is minimized for the conditions described in equations (1) and (2). I have found that the beam size variation is inversely proportional to the one-fourth power of the relative increase of velocity in the axial direction. The beam size variation can be reduced by increasing the absolute gas pressures in the system to a maximum pressure of approximately 600 pounds per square inch. The increase in loss due to Rayleigh scattering limits the further increase of the pressure. The smaller axial velocity gradients that accompany the increased pressures are the direct result not only of reduced initial velocity for comparable focusing action but are also the direct result, in part, of a reduced friction coefficient.

Nevertheless, the broadest useful range of inlet pressure is from 20 pounds per square inch to 600 pounds per square inch. Correspondingly, the exhaust pressures can be from approximately zero pressure to nearly to nearly 600 pounds per square inch, the pressure difference being sufficient to produce an inlet velocity of 0.02 to 1.0 times the speed of sound. Relatively short conduit sections would be used in the lower pressure ranges.

Although my experiments have been conducted primarily with the range of inlet gas velocities between 0.04 and 0.2 times the speed of sound, I have realized that the broadest useful range extends from 0.02 times the speed of sound to the speed of sound. It is, of course, apparent that, in order to have an inlet velocity near the speed of sound, the exhaust velocity must be even nearer to the speed of sound. My experiments have shown that the preferred range of inlet gas velocity lies between 0.04 and 0.08 times the speed of sound. For this preferred range, the exhaust gas velocity would, in each case, be only slightly greater than the inlet gas velocity.

The variation of refractive index near the axis is only approximately quadratic. The resulting focusing is like that of a lens with aberrations and will produce some conversion of the dominant mode of the optical beam, which is presumably coherent laser light, into higher order transverse modes. By staying within the preferred ranges of inlet velocity and inlet and exhaust pressures, it is possible to insure a more nearly parabolic transverse variation of refractive index and therefore a smaller amount of mode conversion. Moreover, it is possible to supplement the viscous heating effect in the gas flow in order to insure a more parabolic transverse temperature variation and index of refraction variation.

Figure 3:
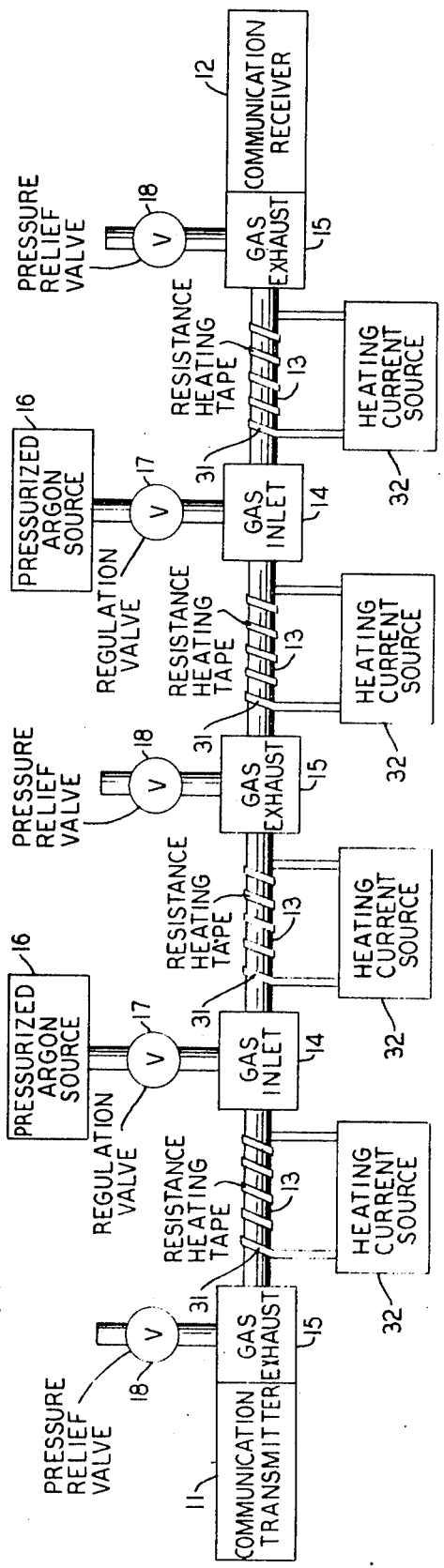
FIG. 3 is a partially pictorial and partially diagrammatic illustration of a modification of the embodiment of FIG. 1 employing supplementary external heating.

Such a supplementary heat scheme is shown in the modified embodiment of FIG. 3. The modified embodiment of FIG. 3 i is substantially identical to that of FIG. 1 except for the addition of the external heating means for the nonporous sections of the conduit 13.

Specifically, resistance heating tapes 31 are wrapped around the nonporous sections 13 and are connected to sources 32 of electrical power which provide the heating current.

It should be clearly understood that external heating as shown in FIG. 3 is purely supplementary to the viscous heating occurring within the conduit 13 and is not in itself necessary. Moreover, it is limited to an amount which is just sufficient to insure a more parabolic transverse refractive index variation in the tube.

Various modifications of my invention will be apparent to those skilled in the art. For example, in cases where the typically turbulent flow of the embodiment of FIG. 1 produces an objectionable amount of light scattering, any of the standard aerodynamic techniques for promoting laminar flow may be employed to reduce the turbulence. For example, small quantities of gas at pressures intermediate the inlet and exhaust pressures may be continuously introduced along the conduit and will tend to maintain the main gas flow away from the wall.

Moreover, in a communication system, the bottled argon gas sources may be replaced by a first auxiliary conduit running parallel to conduit 13 and carrying argon at pressures above the desired inlet pressure; and the gas may be exhausted into a second auxiliary conduit running parallel to conduit 13 and at a pressure smaller than the inlet pressure. The first auxiliary conduit would be coupled to regulation valves 17; and the second auxiliary conduit would be coupled to pressure relief valves 18. Argon or any other suitable gas could then be recirculated from the second auxiliary conduit to the first by suitable pumps.

I claim:

1. Apparatus for guiding a beam of electromagnetic radiation, comprising a conduit having internal transverse dimensions substantially greater than the wavelength of radiation to be transmitted, means for introducing gas in said conduit, means for exhausting gas from said conduit, means for introducing a beam of said radiation to propagate through said gas in said conduit, and means for receiving said beam, said apparatus being characterized in that said gas introducing means and said gas exhausting means are mutually adapted to provide an inlet velocity of said gas producing substantial viscous shear work that is independent of wall friction and yields a transverse variation of temperature and a corresponding significant transverse refractive index variation for focusing said radiation.

2. Apparatus according to claim 1 in which the gas introducing means and gas exhausting means are mutually adapted to provide an inlet velocity of the gas that is in the range between 0.02 and 1.0 times the local speed of sound.

3. Apparatus according to claim 1 in which the gas introducing means and gas exhausting means are mutually adapted to provide an inlet velocity of the gas that is in the range between 0.04 and 0.2 times the speed of sound.

4. Apparatus according to claim 1 in which the gas introducing means and gas exhausting means are mutually adapted to provide an inlet velocity of the gas that is in the range between 0.04 and 0.08 times the speed of sound.

5. Apparatus according to claim 1 in which the gas introducing means and the gas exhausting means both are adapted to operate at gas pressures substantially higher than atmospheric pressure, said gas introducing means providing a gas pressure exceeding 20 pounds per square inch to provide negligible change in Mach number between said introducing means and said exhausting means.

6. Apparatus According to claim 5 in which the gas introducing means operates at a pressure between 400 and 600 pounds per square inch and the gas exhausting means operates at a pressure between 300 and 600 pounds per square inch.

7. Apparatus according to claim 1 in which the gas comprises a monatomic gas.

8. Apparatus according to claim 7 in which the monatomic gas comprises argon.

9. Apparatus according to claim 1 in which the conduit comprises a heat conductive material and the apparatus includes means for heating said material to supplement the transverse variation of temperature produced by viscous shear work by an amount producing improved parabolicity of the transverse refractive index variation.

10. Apparatus according to claim 5 in which a section of the conduit is substantially porous to said gas and the gas introducing means includes a housing surrounding said porous section and having an inlet opening, said gas introducing means including a gas source coupled to said inlet opening and adapted to supply said gas with an inlet velocity producing turbulent flow.

11. Apparatus according to claim 5 in which a section of the conduit is substantially porous to said gas and the gas exhausting means includes a housing surrounding said porous section and having an outlet opening, said gas exhausting means including a valve coupled to said outlet opening and adapted to maintain the gas exhaust pressure greater than atmospheric pressure.

12. Apparatus according to claim 1 in which the conduit comprises in alternating disposition at least two porous sections and at least one nonporous section, the gas introducing means and gas exhausting means being coupled to different ones of said porous sections, the internal surfaces of the nonporous sections being substantially smoother than the internal surfaces of the porous sections.

13. Apparatus according to claim 1 including a plurality of the gas introducing means spaced along the conduit and a plurality of the exhausting means staggered along the conduit with respect to said plurality of gas introducing mean.

14. Apparatus according to claim 13 in which the plurality of gas exhausting means each includes substantially radially symmetrical means for abducting gas from said conduit and a housing surrounding said radially symmetrical means and having an exhaust valve adapted to regulate the exhaust pressure and in which the gas introducing means each include substantially radially symmetrical means for injecting gas into said conduit and housing surrounding said radially symmetrical means and having an inlet valve adapted to regulate the inlet pressure, each of said gas introducing means also including means for supplying said gas to said inlet valves at pressures substantially above atmospheric pressure.